US010599279B2

(12) United States Patent
Nakayama (10) Patent No.: US 10,599,279 B2
(45) Date of Patent: Mar. 24, 2020

(54) TOUCH PANEL INCLUDING SENSOR, SUBSTRATE AND ANISOTROPIC CONDUCTOR, AND WEARABLE DEVICE INCLUDING TOUCH PANEL

(71) Applicant: SMK Corporation, Tokyo (JP)

(72) Inventor: Naomi Nakayama, Toyama (JP)

(73) Assignee: SMK Corporation, Tokyo (JP)

( * ) Notice: Subject to any disclaimer, the term of this patent is extended or adjusted under 35 U.S.C. 154(b) by 0 days.

(21) Appl. No.: 16/173,181

(22) Filed: Oct. 29, 2018

(65) Prior Publication Data

US 2019/0138136 A1    May 9, 2019

(30) Foreign Application Priority Data

Nov. 7, 2017    (JP) ................................ 2017-214340

(51) Int. Cl.
*G06F 3/047*    (2006.01)
*G06F 3/044*    (2006.01)
(Continued)

(52) U.S. Cl.
CPC .............. *G06F 3/047* (2013.01); *G06F 1/163* (2013.01); *G06F 3/03547* (2013.01);
(Continued)

(58) Field of Classification Search
CPC .......... G06F 3/044; G06F 3/047; G06F 1/163; G04G 21/08
See application file for complete search history.

(56) References Cited

U.S. PATENT DOCUMENTS 4,093,992 A * 6/1978 Kawamura ............ G04G 3/025
341/24
2009/0033635 A1    2/2009 Wai
(Continued)

FOREIGN PATENT DOCUMENTS

JP    H06-068258 A    9/1994
JP    2012-212335 A    11/2012

OTHER PUBLICATIONS

An Office Action; "Notification of Reasons for Refusal," mailed by the Japanese Patent Office dated Apr. 10, 2018, which corresponds to Japanese Patent Application No. 2017-214340.

*Primary Examiner* — Laurence J Lee
(74) *Attorney, Agent, or Firm* — Studebaker & Brackett PC (57) ABSTRACT

An object of an aspect of the present invention is to provide a touch panel which does not need a region for thermocompression bonding with FPC. The touch panel includes: a sensor having a base material, a plurality of first electrodes provided on the base material and configured to detect electrostatic capacitance, and a plurality of connection pads connected to the plurality of the first electrodes and provided along a first outer peripheral portion of the base material all through the first outer peripheral portion; a substrate on which a plurality of second electrodes is provided along a second outer peripheral portion all through the second outer peripheral portion; and an anisotropic conductor interposed between the first outer peripheral portion of the sensor and the second outer peripheral portion of the substrate all through the first and second outer peripheral portions and contacting the plurality of the first electrodes and the plurality of the second electrodes.

6 Claims, 5 Drawing Sheets

(51) Int. Cl.
*G06F 1/16* (2006.01)
*G06F 3/0354* (2013.01)
*G06F 3/041* (2006.01)

(52) U.S. Cl.
CPC ............ *G06F 3/044* (2013.01); *G06F 3/0412* (2013.01); *G06F 3/0416* (2013.01); *G06F 3/0443* (2019.05); *G06F 3/0446* (2019.05)

(56) References Cited

U.S. PATENT DOCUMENTS

| | | | |
|---|---|---|---|
| 2010/0309062 A1* | 12/2010 | Chang | H01Q 1/42 343/702 |
| 2012/0249458 A1 | 10/2012 | Okazaki et al. | |
| 2014/0339574 A1* | 11/2014 | Kang | G02F 1/13452 257/88 |
| 2015/0060120 A1* | 3/2015 | Park | G06F 3/044 174/257 |
| 2015/0138699 A1* | 5/2015 | Yamazaki | G06F 1/163 361/679.03 |
| 2017/0177137 A1* | 6/2017 | Bell | G06F 3/0416 |

* cited by examiner

TOUCH PANEL INCLUDING SENSOR, SUBSTRATE AND ANISOTROPIC CONDUCTOR, AND WEARABLE DEVICE INCLUDING TOUCH PANEL

FIELD

The present invention relates to a touch panel and a wearable device.

BACKGROUND

In recent years, a touch panel (also referred to as a touch screen) for detecting an operation input is widely spread on a display such as a liquid crystal display element provided in a mobile device, a cellular phone device, a car navigation device, or the like. As one type of the touch panel, a capacitive touch panel is known (for example, PTL 1). The touch panel described in PTL 1 has electrodes in the X-axis direction and the Y-axis direction provided on a glass substrate and has signal lines (wiring) connected to the respective electrodes. The signal lines drawn from the respective electrodes are gathered at a predetermined position on the glass base material, and a connecting portion in which the signal lines are collected is connected to FPC (Flexible Printed Circuits) by thermocompression bonding or the like. A drive signal to the touch panel or an output signal from the touch panel is transmitted via the FPC to and from a substrate on which a control IC (Integrated Circuit) or the like is mounted.

PRIOR ART DOCUMENT

Patent Literature

Patent Literature 1: JP-A-2012-212335

SUMMARY

However, in the touch panel described in PTL 1, it is necessary to secure a region for thermocompression bonding between the connecting portion and the FPC, and there has been a problem that downsizing of the touch panel is difficult. In addition, by narrowing the signal line drawn around an outer periphery of a base material, a resistance value per unit length of the signal line is increased and impedance of the signal line is increased, and thus there has been a possibility that S/N ratio of the signal transmitted by the signal line is reduced and detection performance of the touch panel deteriorates. In particular, when the touch panel is a narrow frame-shaped product, it is necessary to make the signal line thinner, and thus there has been a possibility that the above-mentioned problem is remarkable.

Further, in recent years, the touch panel has also been required to deal with progress of narrowing of the frame of the display. Specifically, it is required to bend an output portion from the base material immediately outside the display and turn it to the substrate side. In such a case, it is difficult to secure the region for thermocompression bonding. Further, when the base material itself is bent without using the FPC, there is a problem that the signal line on the base material is disconnected. Furthermore, when the signal line is disconnected, or a connection failure occurs in connection by thermocompression bonding or the like, the product must be discarded and yield may be reduced.

Therefore, an object of an aspect of the present invention is to provide a novel and useful touch panel and a wearable device which solve the above-mentioned problems.

An aspect of the present invention is a touch panel including: a sensor having a base material, a plurality of first electrodes provided on the base material and configured to detect electrostatic capacitance, and a plurality of connection pads connected to the plurality of the first electrodes and provided along a first outer peripheral portion of the base material all through the first outer peripheral portion, a substrate on which a plurality of second electrodes is provided along a second outer peripheral portion all through the second outer peripheral portion; and an anisotropic conductor interposed between the first outer peripheral portion of the sensor and the second outer peripheral portion of the substrate all through the first and second outer peripheral portions and contacting the plurality of the first electrodes and the plurality of the second electrodes.

According to an aspect of the present invention, at least the region for thermocompression bonding between the connecting portion and the FPC can be made unnecessary. It should be noted that contents of an aspect of the present invention are not construed as being limited by effects exemplified in the present specification.

DESCRIPTION OF EMBODIMENTS

Hereinafter, embodiments of an aspect of the present invention will be described with reference to the drawings. The description will be given in the following order.

<1. First Embodiment>
<2. Second Embodiment>
<3. Modification>

However, the embodiments and the like described below exemplify structures for embodying a technical idea of an aspect of the present invention, and an aspect of the present invention is not limited to the exemplified structure. It should be noted that members described in claims is not limited to members of the embodiment. In particular, unless otherwise stated that a dimension, material, shape, relative arrangement, directions of up, down, left, right and the like of the constituent members described in the embodiment are limited, the scope of an aspect of the present invention is not limited thereto only, but it is merely an explanation example. Not that sizes and positional relationships of the members shown in the drawings may be exaggerated in order to clarify the explanation, and only a part of reference numerals may be shown in some case in order to prevent complication of illustration. Further, in the following description, the same name and reference numeral denote the same member or the member having the same quality, and redundant explanation will be appropriately omitted. Furthermore, each element constituting an aspect of the present invention may have a configuration in which a plurality of elements is constituted by the same member so that one member serves as the plurality of elements, or on the contrary, a function of one member may be shared and realized by a plurality of members.

1. First Embodiment

Hereinafter, a first embodiment of an aspect of the present invention will be described. In an aspect of the present embodiment, as an example of a touch panel, a self-capacitance type capacitive touch panel for detecting a change in electrostatic capacitance generated between an electrode and a human body (fingertip), a pen for operation or the like will be described as an example. Such a touch panel can be used as an input device of various electronic devices such as a mobile phone and a car navigation device. In the present embodiment, an example in which the touch panel is applied to a wristwatch-type wearable device will be described.

[Example of Overall Configuration of Wearable Device]

Figure 1:
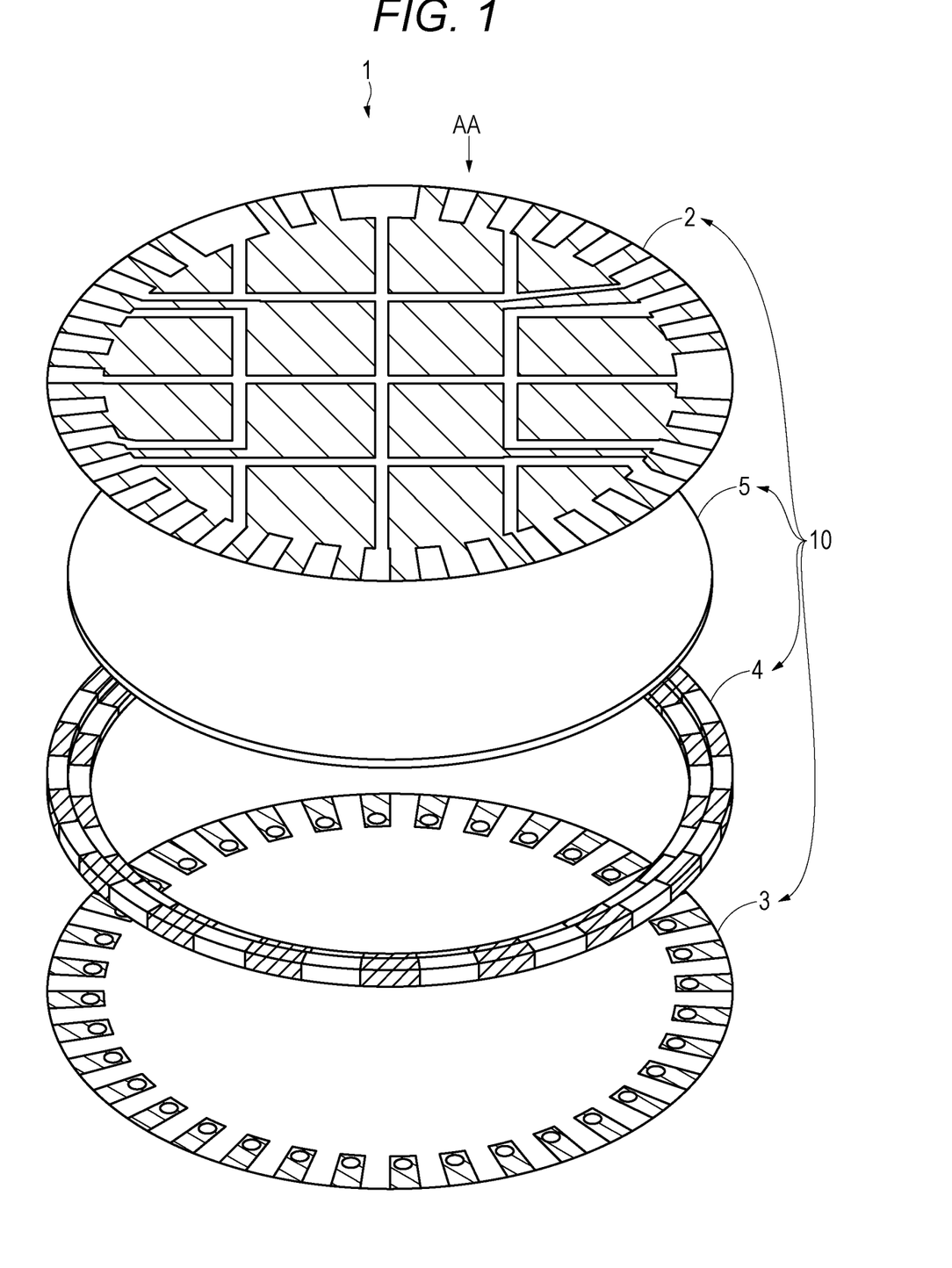
FIG. 1 is an exploded perspective view showing a structural example of a wearable device according to a first embodiment.

FIG. 1 is an exploded perspective view of a wearable device 1 according to a first embodiment. The wearable device 1 includes, for example, a sensor 2, a substrate 3, a zebra connector 4 which is an example of an anisotropic conductor, and a display 5. The sensor 2, the display 5, the zebra connector 4, and the substrate 3 are arranged stacked in a direction AA visually recognized by a user of the wearable device 1. The touch panel (a touch panel 10) according to an aspect of the present embodiment has a structure including the sensor 2, the substrate 3 and the zebra connector 4 in a structure of the wearable device 1 described above.

[Sensor]

Figure 2:
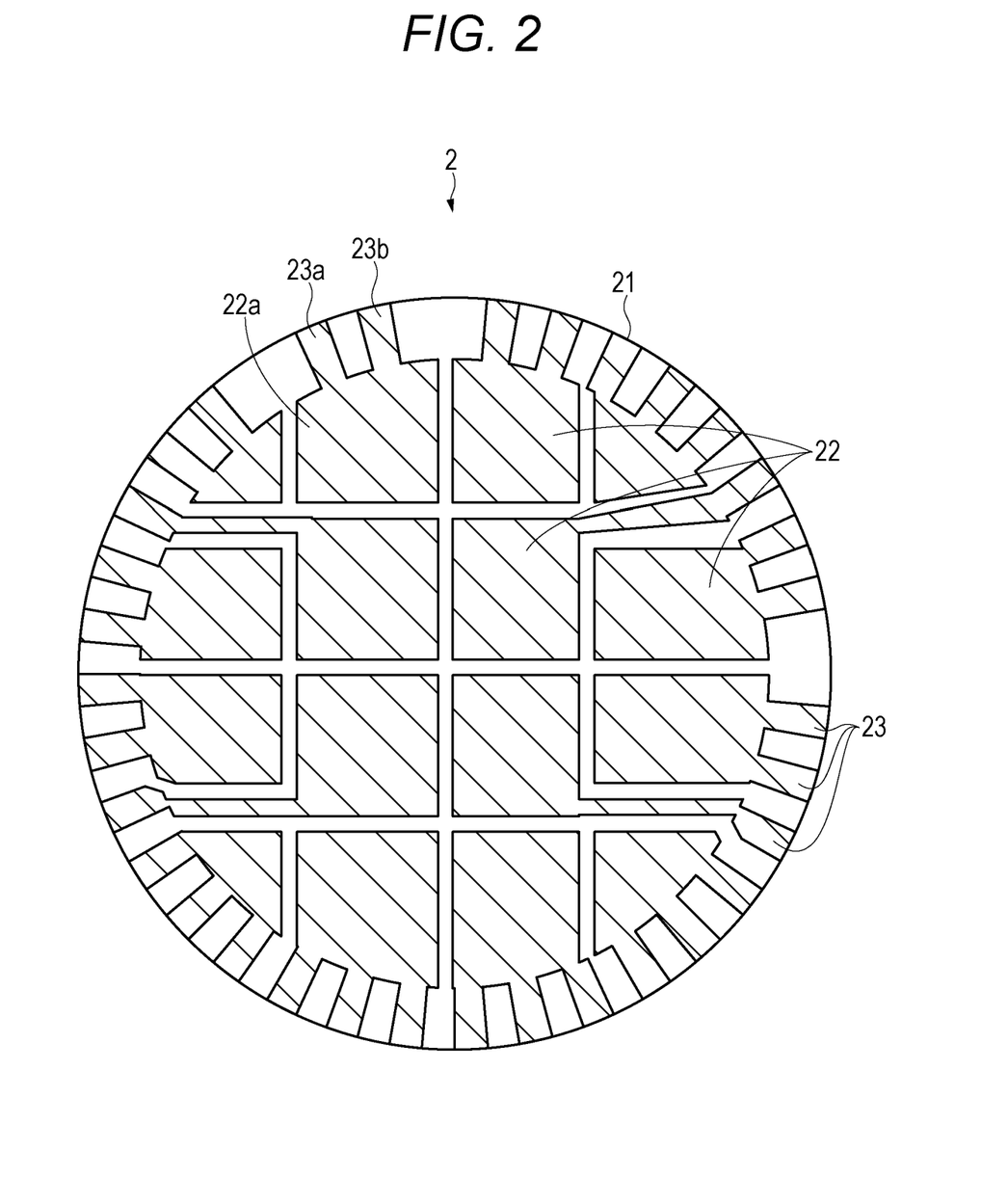
FIG. 2 is a view for explaining a structural example of a sensor according to the first embodiment.

Subsequently, each part constituting the wearable device 1 will be described in detail. First, the sensor 2 will be described in detail. FIG. 2 is a plan view for explaining a structural example of the sensor 2, and is a view showing electrodes 22 and the like which will be described later as seen through from an operation input surface side. The sensor 2 has a circular base material 21. The base material 21 is an insulative material such as glass or film and is a transparent material to such an extent that display content of the display 5 can be visually recognized. An electrode 22 (a first electrode) is provided on a main surface of the base material 21 facing the substrate 3. In an example shown in FIG. 2, sixteen electrodes 22 are provided, and these electrodes 22 are insulated from each other.

On an outer peripheral portion (a first outer peripheral portion) of the base material 21, a connection pad 23 connected to the electrode 22 is provided along the outer peripheral portion thereof. The outer peripheral portion of the base material 21 means a region in the vicinity of an outer edge of the base material 21. The connection pad 23 is a portion to be electrically connected to an electrode of the substrate 3 described later via the zebra connector 4. Specifically, two connection pads 23a and 23b provided on the outer peripheral portion of the base material 21 are connected to a certain electrode 22a. Further, one connection pad is connected to each of four electrodes 22 arranged near a center of the base material 21. As described above, the number of the connection pads 23 connected to one electrode 22 may be one or plural, however, it is preferable to use a plurality of connection pads 23 in that a contact area of the connection pad 23 is increased so that a contact resistance can be reduced.

The electrode 22 and the connection pad 23 are transparent electrode patterns made of an ITO (Indium Tin Oxide) film or the like. The electrode 22 and the connection pad 23 are formed by a process using, for example, a photolithography method or a laser etching method. The shape and the number of the electrodes 22, the shape and the number of the connection pads 23 are appropriately set according to patterning at the time of forming the electrodes 22 and the connection pads 23, a size of the base material 21, and the like. In addition, the electrode 22 and the connection pad 23 may be formed by a printing method using a transparent conductive ink, or a method of forming the electrode 22 and a method of forming the connection pad 23 may be different from each other.

[Substrate]

Figure 3:
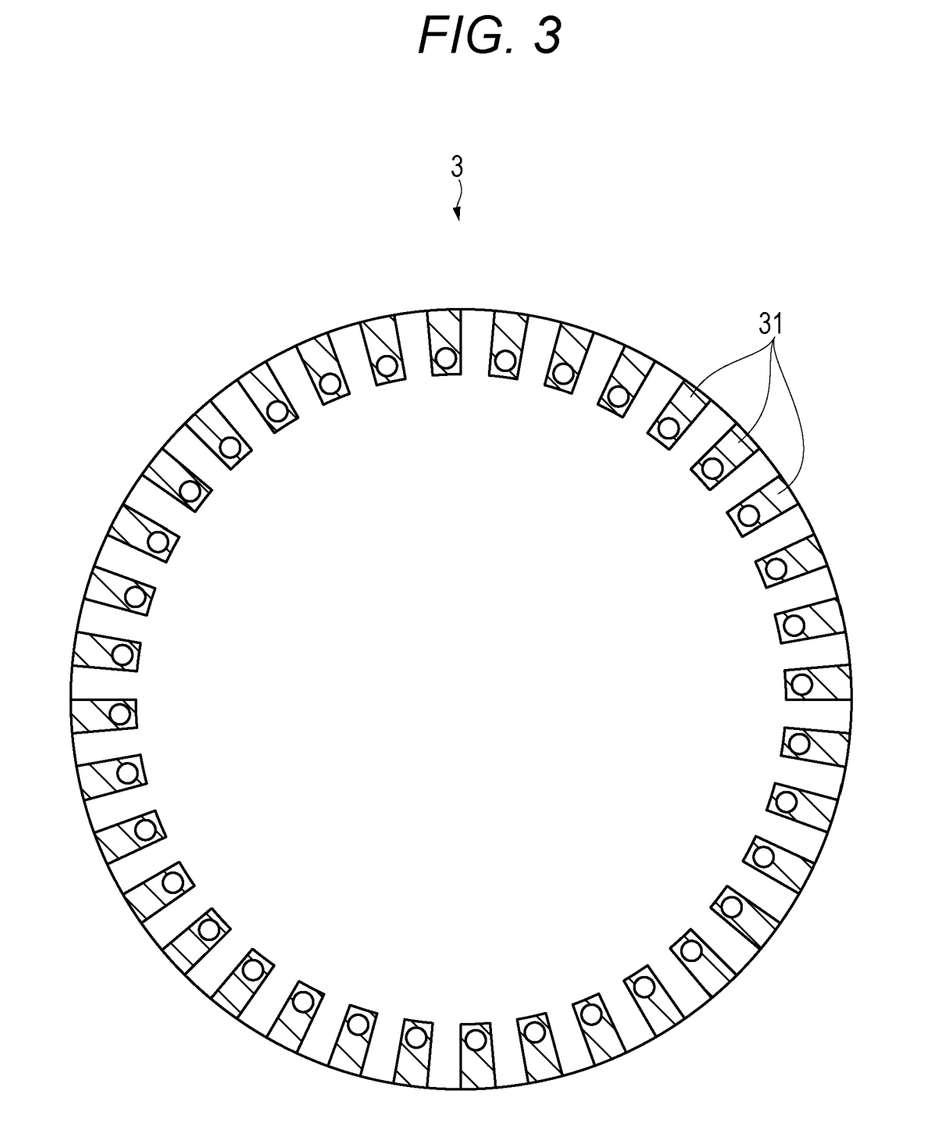
FIG. 3 is a view for explaining a structural example of a substrate according to the first embodiment.

Next, the substrate 3 will be described in detail. FIG. 3 is a view for explaining a structural example of the substrate 3. The substrate 3 has substantially the same size as the size of the sensor 2 and has a circular shape. The substrate 3 has electrodes (second electrodes) 31 provided along an outer peripheral portion (a second outer peripheral portion) of the substrate 3. The electrode 31 is electrically connected to the connection pad 23 of the sensor 2 described above via the zebra connector 4. In FIG. 3, although the electrodes 31 are provided at substantially equal intervals along the outer peripheral portion, it is not necessary that all the electrodes 31 are electrically connected to the connection pads 23, and only some of the electrodes 31 may be electrically connected to the connection pads 23. Further, a number of electrodes 31 according to an arrangement pattern of the connection pads 23 may be provided at appropriate positions on the substrate 3.

A control IC (not shown) as a controller is mounted on the substrate 3. The control IC is connected to the electrode 31 and is connected to the sensor 2 via the electrode 31 and the zebra connector 4. The control IC supplies a drive signal to the sensor 2 and detects a position where a touch operation is performed on the sensor 2 based on an output signal from the sensor 2. The control IC performs various controls according to a detection result.

[Zebra Connector]

Figure 4:
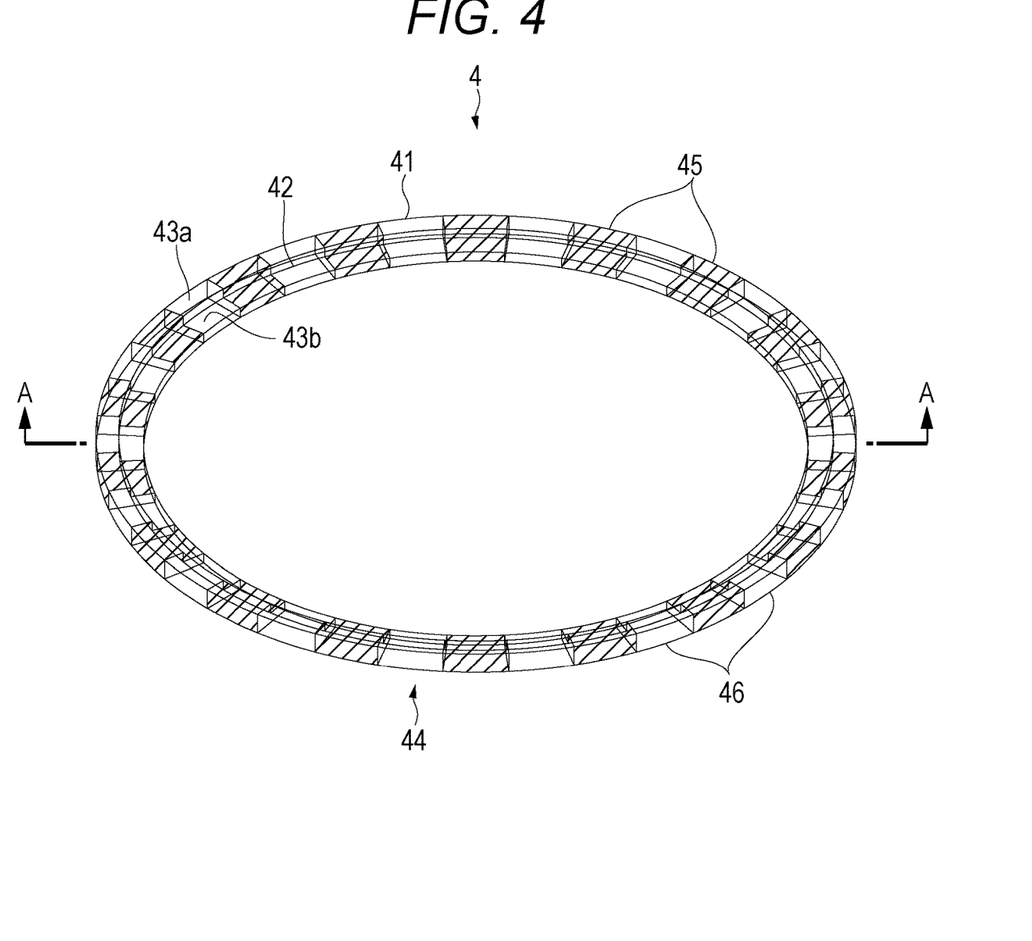
FIG. 4 is a view for explaining a structural example of a zebra connector according to the first embodiment.
Figure 5:
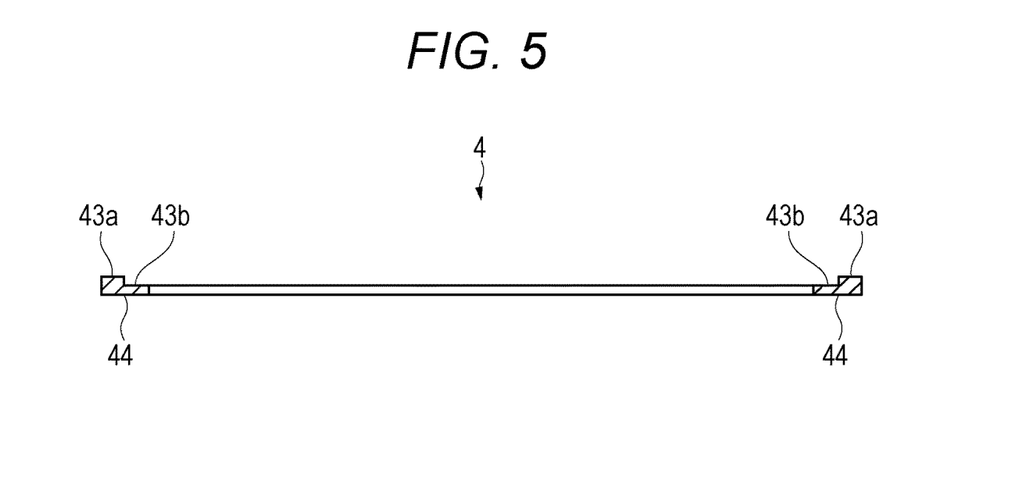
FIG. 5 is a cross-sectional view for explaining the structural example of the zebra connector according to the first embodiment.

Next, the zebra connector 4 will be described in detail. FIG. 4 is a perspective view for explaining a structural example of the zebra connector 4, and FIG. 5 is a cross-sectional view showing a cross-section when the zebra connector 4 is cut along a cutting line A-A in FIG. 4.

The zebra connector 4 is interposed between an outer peripheral portion of the sensor 2 and an outer peripheral portion of the substrate 3. The zebra connector 4 is rubber-like material having a certain elasticity and is substantially the same size (diameter) as the base material 21 and the substrate 3 of the sensor 2. The zebra connector 4 has a ring-shaped base portion 41. A stepped portion 42 is formed substantially at the center of one main surface (a surface close to the operation input side) of the base portion 41. An inner side of the base portion 41 is lower than an outer side by the stepped portion 42, and a cross-section of the base portion 41 has an L-shape as shown in FIG. 5. The base portion 41 has an outer peripheral upper surface 43a and an inner peripheral upper surface 43b as the one main surface and a bottom surface 44 as the other main surface.

In the base portion 41 of the zebra connector 4, a conductive portion 45 which is a conductive portion and an insulating portion 46 which is an insulating portion are alternately formed, and the conductive portion 45 selectively conducts between the outer peripheral upper surface 43a or the inner peripheral upper surface 43b and the bottom surface 44. In FIG. 4, the conductive portions 45 are hatched. In FIG. 4, a pitch interval between the conductive portion 45 and the insulating portion 46 is shown to be large for easy understanding, however, the zebra connector 4 in which the conductive portion 45 and the insulating portion 46 are formed at smaller pitch intervals, for example, at a pitch of about 0.1 to 0.3 mm can also be suitably used.

[Display]

Next, the display 5 will be described in detail. The display 5 is interposed between the sensor 2 and the substrate 3. The display 5 is constituted by an LCD (Liquid Crystal Display), an OLED (Organic Light Emitting Diode) or the like and can arbitrarily display by a dot matrix. The display 5 has a circular shape and has a size such that an outer peripheral portion (a region in the vicinity of an outer edge) of the display 5 can be placed on the inner peripheral upper surface 43b of the zebra connector 4. Contents corresponding to functions of the wearable device 1 are displayed on the display 5. For example, date, time, environmental information such as temperature, humidity and atmospheric pressure, current position, or the like are displayed on the display 5. A game display, television broadcasting, information obtained through a network such as the Internet, or the like may be displayed on the display 5. In addition, information obtained by linking the wearable device 1 with a portable device such as a smartphone or the like may be displayed on the display 5.

Note that a circuit for driving the display 5 may be further mounted on the substrate 3. The circuit for driving the display 5 is a circuit having a control IC or the like as a controller for performing control corresponding to a structure of the display 5 and may be an IC integrated with the control IC related to the touch panel 10 described above. The connection pads (not shown) respectively facing the display 5 and the substrate 3 may be arranged so that the display 5 and the substrate 3 can be connected via the zebra connector 4, similarly to the above-mentioned structure related to the connection pad 23 of the sensor 2 and the electrode 31 on the substrate 3. In this case, the electrode 22 of the sensor, the electrode of the display 5, and the electrode 31 on the substrate 3 facing them are appropriately arranged so as not to cause a short circuit via the zebra connector 4. Alternatively, the display 5 and the substrate 3 may be connected by using FPC or the like (not shown). In this way, the circuit for driving the display 5 is further mounted on the substrate 3, so that it is possible to commonly use a substrate on which a circuit for driving the sensor 2 and processing the output signal from the sensor 2 is mounted, and a substrate on which the circuit for driving the display is mounted, thereby downsizing the device.

[Method of Manufacturing Wearable Device]

Next, an example of a method of manufacturing the wearable device 1 will be described. The outer peripheral portion of the display 5 is placed on the inner peripheral upper surface 43b of the zebra connector 4. Thus, the display 5 is supported and positioned by the zebra connector 4.

Subsequently, the outer peripheral portion of the sensor 2 is brought into contact with the outer peripheral upper surface 43a of the zebra connector 4, and the outer peripheral portion of the substrate 3 is brought into contact with the bottom surface 44 of the zebra connector 4. Then, the sensor 2, the substrate 3, and the zebra connector 4 are integrated by a pressing force in a vertical direction (the direction AA) in FIG. 1 by using a case, a frame or the like having a shape corresponding to the touch panel 10 (not shown). When appropriate pressure is applied, a predetermined electrode 22 in the sensor 2 and the electrode 31 facing the electrode 22 in the substrate 3 are electrically conducted by contact with the conductive portion 45 of the zebra connector 4. The drive signal to the sensor 2 and the output signal output in response to an operation input to the sensor 2 are transmitted between the sensor 2 and the control IC mounted on the substrate 3 via the zebra connector 4 and the electrode 31.

With the wearable device 1 or the touch panel 10 described above, effects exemplified below can be obtained.

Since it is configured such that the sensor 2 and the substrate 3 is connected to be conducted by pressing using the zebra connector 4, a region for thermocompression bonding of a connecting portion and the FPC, which has been conventionally necessary, can be made unnecessary. Therefore, the wearable device 1 or the touch panel 10 can be downsized.

Further, it is possible to connect the electrode 22 and the connection pad 23 at the shortest distance without using wirings extending along the outer periphery of the base material as in the conventional case. Therefore, impedance of a signal line can be reduced.

Furthermore, it is not necessary to bend the base material 21, and there is no disconnection problem.

Even when an electrical connection defect due to a relative positional deviation or the like between the sensor 2 and the substrate 3 occurs, it is only necessary to perform pressing using the frame or the like after positioning or the like again. Consequently, when the positional deviation conventionally occurs at the connecting portion by thermocompression bonding, a product could not be corrected and thus forced to be discarded, however, since it is not necessary to discard the product, yield in a manufacturing process can be improved.

2. Second Embodiment

Next, a second embodiment will be described. Items described in the first embodiment can also be applied to the second embodiment unless otherwise specified.

Figure 6:
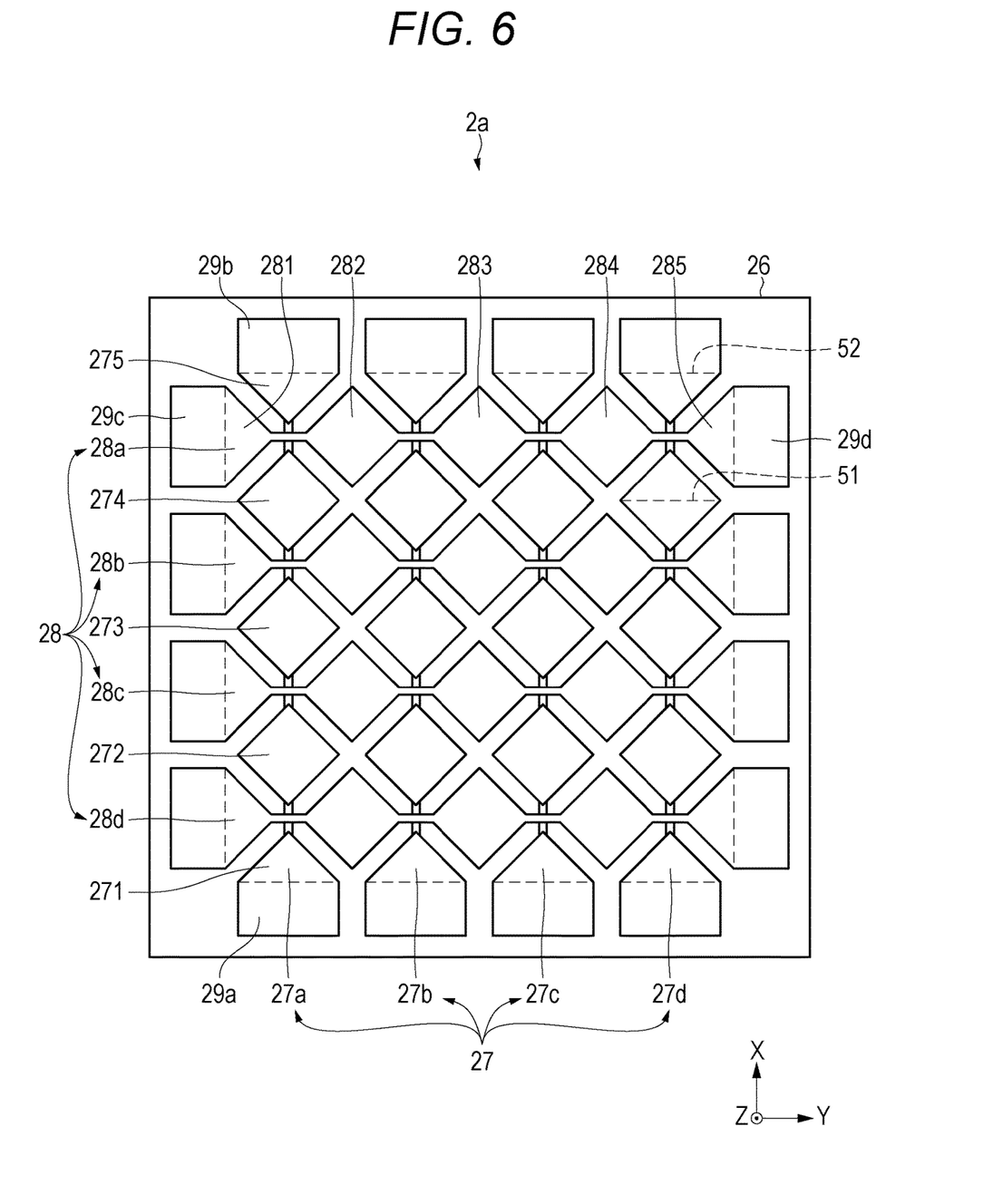
FIG. 6 is a view for explaining the structural example of the sensor according to a second embodiment.

FIG. 6 is a plan view for explaining the structural example of the sensor (a sensor 2a) according to the second embodiment. The sensor 2a has a rectangular base material 26. The base material 26 is an insulative material such as glass or film and is transparent to the extent that display contents of the display can be visually recognized.

In the second embodiment, transparent electrode patterns 27 and 28 made of the ITO film or the like are provided on one surface of one base material 26. The transparent electrode pattern 27 has four rows of transparent electrode patterns 27a, 27b, 27c and 27d extending in the X-axis direction and aligned in the Y-axis direction. The transparent electrode pattern 27 has a plurality of electrodes. For example, the transparent electrode pattern 27a includes electrodes 271, 272, 273, 274 and 275 in order from the side close to one outer edge of the base material 26. Among them, the electrodes 272, 273 and 274 have a rhombus shape (diamond shape) having substantially the same diagonal length, and the electrodes 271 and 275 at both ends have a triangular shape in which the rhombus shape is divided by a diagonal line. The same applies to other transparent electrode patterns 27b and the like.

The transparent electrode pattern 28 has four rows of transparent electrode patterns 28a, 28b, 28c and 28d extending in the Y-axis direction and aligned in the X-axis direction. The transparent electrode pattern 28 has a plurality of electrodes. For example, the transparent electrode pattern 28a includes electrodes 281, 282, 283, 284 and 285 in order from the side close to one outer edge of the base material 26. Among them, the electrodes 282, 283 and 284 have approximately the same size and shape as, for example, the electrode 272, and the electrodes 281 and 285 at both ends have approximately the same size and shape as, for example, the electrode 271. The same applies to other transparent electrode patterns 28b and the like. Note that each electrode constituting the transparent electrode pattern 28 is connected by a known bridge structure (not shown).

In addition to such a mode, for example, a bonding structure may be adopted in which the transparent electrode pattern 27 is provided on one base material out of the two base materials, the transparent electrode pattern 28 is provided on the other base material out of the two base materials, and these two base materials are arranged to face each other in the Z-axis direction and bonded by an optical adhesive sheet (OCA (Optical Clear Adhesive)) or the like.

The connection pads made of the ITO film or the like are connected to the electrodes at both ends (first electrodes in the second embodiment) located at portions close to the outer edges among the electrodes constituting the transparent electrode pattern 27. Further, the connection pads made of the ITO film or the like are connected to the electrodes at both ends (first electrodes in the second embodiment) located at portions close to the outer edges among the electrodes constituting the transparent electrode pattern 28. For example, a rectangular connection pad 29a is connected to a side portion, which is substantially parallel to the outer edge of the base material 26 among three side portions of the electrode 271 constituting the transparent electrode pattern 27a. For example, a rectangular connection pad 29b is connected to a side portion, which is substantially parallel to the outer edge of the base material 26 among the three side portions of the electrode 275 constituting the transparent electrode pattern 27a. Further, for example, a rectangular connection pad 29c is connected to a side portion, which is substantially parallel to the outer edge of the base material 26 among the three side portions of the electrode 281 constituting the transparent electrode pattern 28a. For example, a rectangular connection pad 29d is connected to a side portion, which is substantially parallel to the outer edge of the base material 26 among the three side portions of the electrode 285 constituting the transparent electrode pattern 28a. In FIG. 6, in order to facilitate understanding, an imaginary dotted line is added to a boundary between the electrode and the connection pad. When it is not necessary to distinguish individual connection pads, it is collectively referred to as the connection pad 29 as appropriate.

The connection pad 29 is connected to the electrode located at an end portion among the electrodes constituting the transparent electrode patterns 27 and 28, so that the connection pad 29 is provided in a frame shape along the outer peripheral portion (first outer peripheral portion in the second embodiment) of the base material 26. The outer peripheral portion of the base material 26 means a region in the vicinity of the outer edge of the base material 26. The transparent electrode patterns 27, 28 and the connection pad 29 are formed by the process using, for example, the photolithography method or the laser etching method, however, they may be formed by different methods. Further, the transparent electrode patterns 27, 28 and the connection pad 29 may be formed by a printing method using transparent conductive ink.

The connection pad 29 according to the second embodiment has a width substantially equal to the maximum width of the electrode to which the connection pad 29 is connected. For example, in the present embodiment, the maximum width of the electrode is a length of a diagonal line 51 of the electrode. The connection pad 29 has a width 52 which is substantially the same as the length of the diagonal line 51. Substantially the same means the same or the same in a range of a fine error which can occur in the manufacturing process. Further, the connection pad 29 has a rectangular shape maintaining the width 52 toward the outside of the base material 26.

Although not shown, the substrate, the zebra connector, and the display have the same structure and the same operation as the first embodiment except that the entire shape is rectangular corresponding to the shape (rectangular shape) of the sensor 2a. The touch panel according to the second embodiment is configured to include, for example, the sensor 2a, the substrate and the zebra connector. The touch panel operates as a mutual capacitance type capacitive touch panel which detects a change in electrostatic capacitance between the transparent electrode patterns 27 and 28 respectively functioning as a transmission electrode and a reception electrode.

In the same manner as in the first embodiment, each member is integrated with each other by the pressing force. That is, the outer peripheral portion of the display is placed on the inner peripheral upper surface of the zebra connector. Thus, the display is supported and positioned by the zebra connector. Subsequently, the outer peripheral portion of the sensor 2a is brought into contact with the outer peripheral upper surface of the zebra connector, and the outer peripheral portion of the substrate, on which the control IC is mounted, and a predetermined wiring pattern is formed, is brought into contact with the bottom surface of the zebra connector. Then, the sensor 2a, the substrate and the zebra connector are integrated by the pressing force in the vertical direction (Z-axis direction in FIG. 6) by using the case, the frame or the like having the shape corresponding to the touch panel (not shown). When appropriate pressure is applied, the electrode in the substrate corresponding to the predetermined connection pad 29 in the sensor 2a and the electrode facing the electrode in the substrate are electrically conducted by contact with the conductive portion of the zebra connector. Thus, the drive signal to the sensor 2a and the output signal output in response to the operation input to the sensor 2a are transmitted between the sensor 2a and the control IC mounted on the substrate via the zebra connector and the electrode.

According to the second embodiment described above, effects exemplified below can be obtained in addition to the effects obtained by the above-described first embodiment.

The connection pad 29 is configured to have the maximum width of the electrode, so that an area of the connection pad 29 can be increased. Thus, a contact area between the sensor 2a and the anisotropic conductor can be increased, and the contact resistance can be reduced. Therefore, impedance of a signal path from the sensor 2a to the control IC can be further reduced, and it is possible to prevent the detection performance of the touch panel from deteriorating.

3. Modification

Although the embodiments of an aspect of the present invention have been concretely described above, an aspect of the present invention is not limited to the above-described embodiments, but various modifications can be made.

In the second embodiment described above, a circuit for driving the display may be further mounted on the substrate similarly to the structure described in the first embodiment. Thus, it is possible to commonly use the substrate on which the circuit for driving the sensor 2a and processing the output signal form the sensor 2a is mounted, and the substrate on which the circuit for driving the display is mounted.

In the second embodiment described above, the connection pad 29 may be connected to only one of the electrodes instead of both ends of the transparent electrode pattern. It is also possible to adopt a structure in which the connection pad 29 is widened to such an extent that it does not contact adjacent connection pads 29 from the portion of the width 52 toward the outside of the base material 26. Thus, the area of the connection pad 29 can be made larger. Further, the number of transparent electrode patterns and the number, shape and the like of the electrodes constituting the transparent electrode pattern can be appropriately changed.

It goes without saying that a structure corresponding to the device to which the touch panel is applied may be added as appropriate. For example, when the touch panel is applied to the wristwatch-type wearable device as in the above-described embodiment, the wearable device may have a structure of a band, a button, and the like.

As described in the above-described embodiment, the capacitive touch panel of an aspect of the present invention may be the self-capacitance type capacitive touch panel, or the mutual capacitance type capacitive touch panel, and it can also be applied to a resistive film type touch panel.

The structures, methods, processes, shapes, materials, numerical values, and the like mentioned in the above-described embodiments and modifications are merely examples, and different structures, methods, processes, shapes, materials, numerical values and the like may be used as needed, or they may be replaced with known ones. Further, the structures, methods, processes, shapes, materials, numerical values and the like in the embodiments and modifications can be combined with each other as long as technical contradiction does not occur.

REFERENCE SIGNS LIST

1: Wearable device, 2, 2a: Sensor, 3: Substrate, 4: Zebra connector, 5: Display, 10: Touch panel, 21, 26: Base material, 22, 31: Electrode, 23, 29: Connection pad, 52: Width

The invention claimed is:

1. A touch panel comprising:
a sensor having a base material, a plurality of first electrodes provided on a main surface of the base material facing a substrate of the base material and configured to detect electrostatic capacitance, and a plurality of connection pads connected to the plurality of the first electrodes on the main surface of the base material and provided along a first outer peripheral portion of the base material entirely around the first outer peripheral portion;
the substrate having substantially the same size as the size of the sensor on which a plurality of second electrodes is provided along a second outer peripheral portion entirely around the second outer peripheral portion; and
an anisotropic conductor having substantially the same size as the base material and the substrate interposed between the first outer peripheral portion of the sensor and the second outer peripheral portion of the substrate entirely around the first and second outer peripheral portions and contacting the plurality of the first electrodes and the plurality of the second electrodes.

2. The touch panel according to claim 1, wherein the plurality of connection pads is connected to one of the plurality of the first electrodes.

3. The touch panel according to claim 1, wherein the plurality of the connection pads has a width substantially equal to the maximum width of the plurality of the first electrodes to which the plurality of the connection pads is connected.

4. The touch panel according to claim 1, further comprising
a display interposed between the sensor and the substrate, wherein
the display is supported by the anisotropic conductor.

5. The touch panel according to claim 4, wherein the substrate is provided with a controller connected to the sensor and a controller connected to the display.

6. A wearable device comprising the touch panel according to claim 1.

* * * * *